Jan. 27, 1970  H. A. QUINTON ET AL  3,491,448
COMPASS RULER
Filed July 10, 1968  3 Sheets-Sheet 1
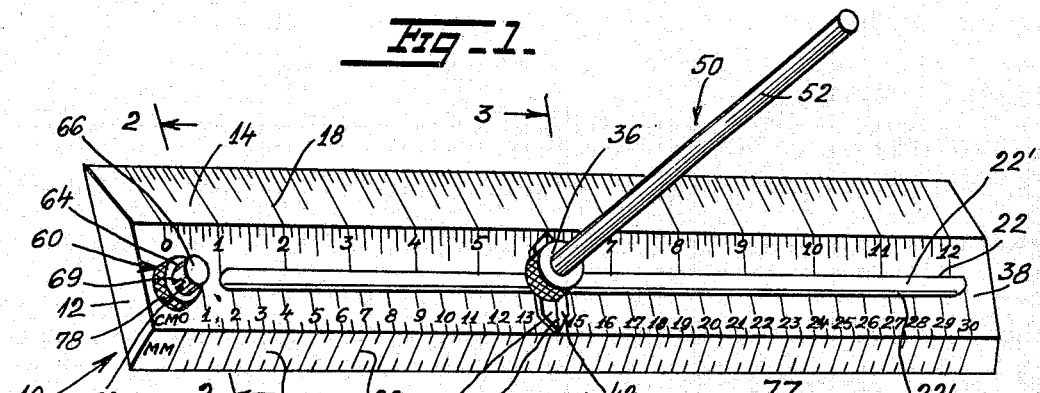
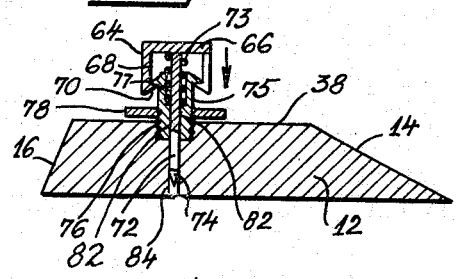
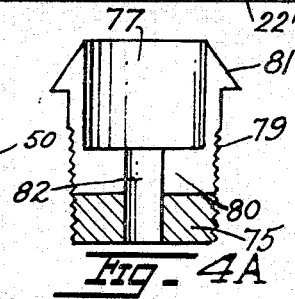
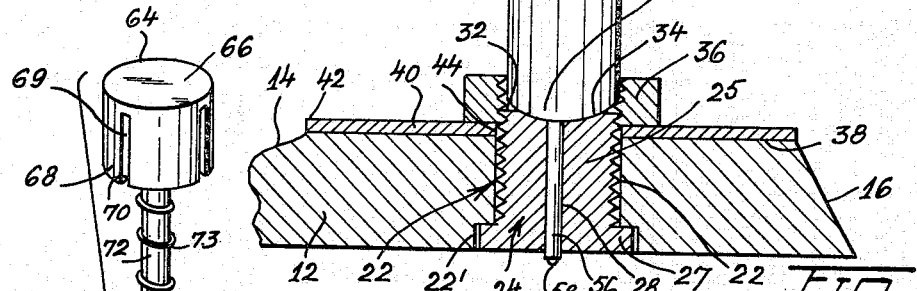
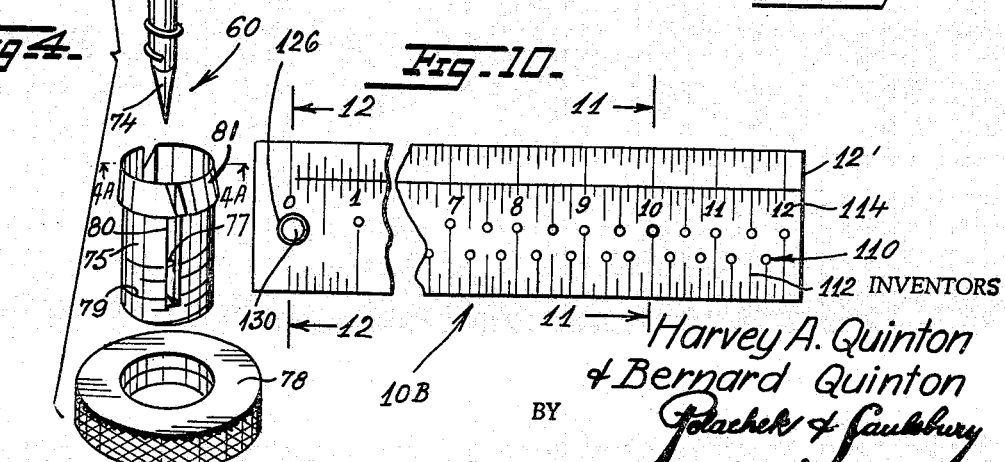
INVENTORS
Harvey A. Quinton
& Bernard Quinton
BY
Polachek & Saulsbury
ATTORNEY Jan. 27, 1970   H. A. QUINTON ET AL   3,491,448
COMPASS RULER
Filed July 10, 1968   3 Sheets-Sheet 2
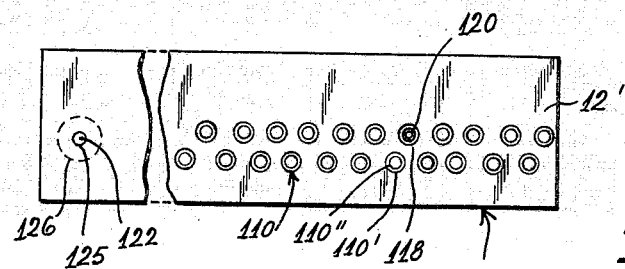
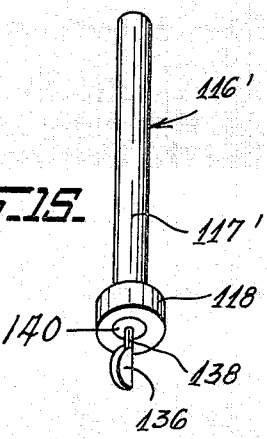
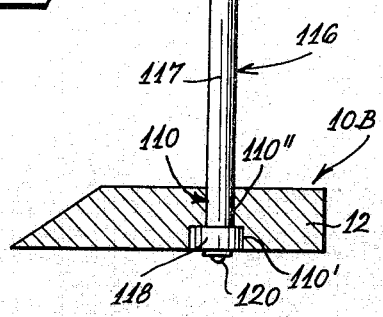
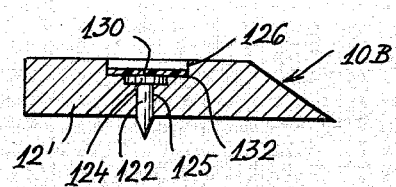
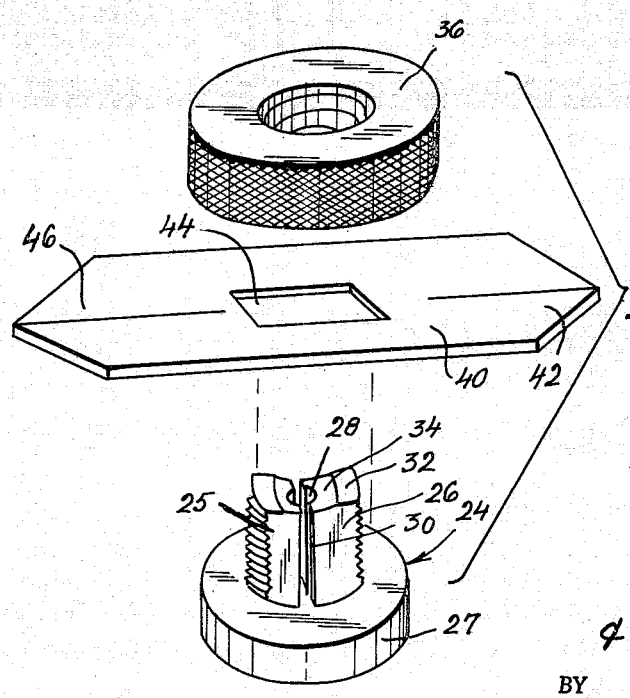
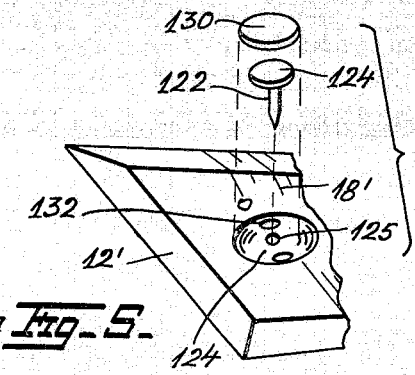
INVENTORS
Harvey A. Quinton
& Bernard Quinton
BY Polachek & Saulsbury
ATTORNEY

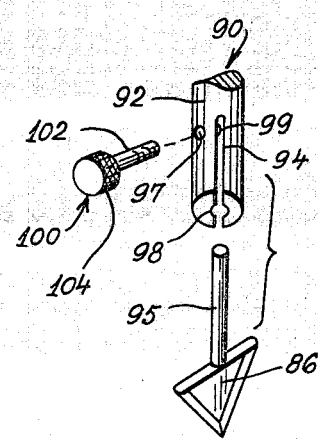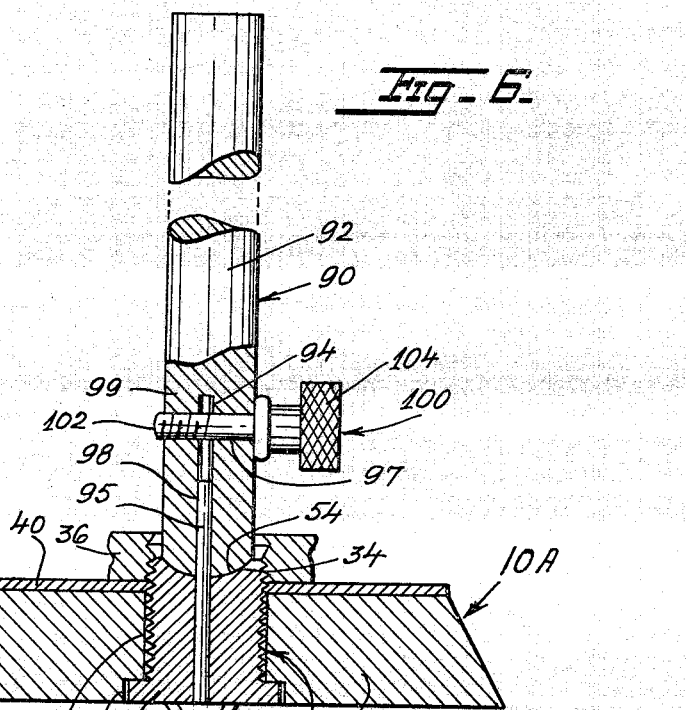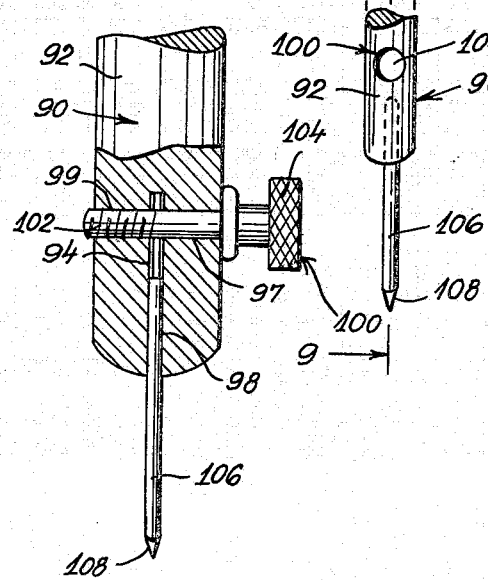

United States Patent Office 3,491,448
Patented Jan. 27, 1970

3,491,448
COMPASS RULER
Harvey A. Quinton and Bernard Quinton, both of
145 Wallace Ave., Mount Vernon, N.Y. 10552
Filed July 10, 1968, Ser. No. 743,760
Int. Cl. B43l 9/04
U.S. Cl. 33—27          5 Claims

ABSTRACT OF THE DISCLOSURE

A straight edge ruler is adapted to serve as a drawing compass. The ruler is provided with a long slot or a plurality of holes for removably mounting a pen, stylus or knife in a vertical position a selected distance from the zero reading of the ruler scale. At the zero reading is a spring biased push pin which is normally retracted but which can be extended out of the ruler to serve as a pivot point around which the ruler can be rotated while the pen, stylus or knife outlines a circle around the pivot point.

---

The invention relates generally to the art of drawing instruments and more particularly concerns a ruler adapted to serve as a drawing compass.

Drawing compasses generally are instruments having a pair of pivotable legs disposed in an inverted V-shaped configuration with a pen or pencil at one end of one leg and a pivot point at the end of the other leg. The present invention is a departure from this construction in that a flat bar ruler is provided with a push pin and pen holder to adapt the ruler to serve as a compass.

According to the invention, there is provided a straight edge ruler which can be used in normal fashion for measuring lengths in inches and fractions thereof, or in centimeters and millimeters. In the body of the ruler, is a long slot which is T-shaped in cross section. A nut, screw and pointer are movably mounted at the slot and can be adjustably secured at any desired point along the slot. A ball point pen, stylus or knife can be supported by the nut and screw with the writing or cutting point extended below the bottom of the ruler. At the zero position of a scale the ruler is a spring biased pushpin held by another nut and screw, with a point extendable below the ruler to serve as a pivot point.

In another form of the invention, the ruler has a plurality of spaced holes to support a pen, stylus or knife.

The invention will be explained in detail in connection with the drawings wherein:

FIGURE 1 is a perspective view of a compass ruler embodying the invention.

FIG. 2 and FIG. 3 are enlarged sectional views taken on lines 2—2 and 3—3 respectively of FIG. 1.

FIG. 4 is an exploded perspective view on an enlarged scale of parts of a push pin assembly employed in the compass ruler.

FIG. 4A is an enlarged sectional view of the screw which holds the pushpin at the pivot point, taken on line 4A—4A of FIG. 4.

FIG. 5 is an enlarged exploded perspective view of parts of a pen holder and pointer assembly employed in the compass ruler.

FIG. 6 is a sectional view similar to FIG. 3 showing the compass ruler supporting a knife blade and holder.

FIG. 7 is an exploded perspective view of parts of the knife blade and holder assembly of FIG. 6.

FIG. 8 is a side view of a stylus and holder.

FIG. 9 is an enlarged fragmentary sectional view taken on line 9—9 of FIG. 8.

FIG. 10 is a top plan view of another compass ruler according to the invention parts being broken away.

FIG. 11 and FIG. 12 are enlarged sectional views taken on lines 11—11 and 12—12 respectively of FIG. 10.

FIG. 13 is a bottom plan view of the ruler of FIG. 10.

FIG. 14 is an enlarged exploded perspective view of parts of the compass ruler of FIG. 10.

FIG. 15 is a perspective view of a cutting tool which can be used with the compass ruler of FIG. 10.

Referring first to FIGS. 1–3, there is shown a compass ruler 10 including a flat rigid bar 12 with opposite beveled long edges 14 and 16. Edge 14 has a scale 18 ruled in inches and fractions thereof, and edge 16 has a scale 20 ruled in millimeters and centimeters. In the flat body of the ruler is a long slot 22. The slot has an inverted T-shape in cross section with a wider bottom portion 22' and narrower portion 22". Slidably disposed in the slot 22 is a screw 24 having a shank 25 formed with flat sides 26, and a head 27. Hole 28 extends axially of the screw. A slot 30 extends diametrically of shank 25 through hole 28 and perpendicularly to sides 26; see FIG. 5. The upper end 32 of the screw is formed with a concavity 34. The shank 25 extends through slot portion 22" while the head 27 of the screw fits slidably in the lower slot portion 22'. A nut 36 is engaged on the threaded shank where it extends above the upper side 38 of bar 12. A flat plate 40 with opposite pointed ends 42 is provided with a rectangular hole 44 so that plate 40 fits nonrotatably on the shank of the screw at the top of bar 12. Index lines 46 are inscribed in alignment on pointed ends 42. The lines 46 extend transversely of bar 12 parallel to the scale lines of the bar.

A drawing pen 50 is removably mounted in the holder defined by the screw 24 and nut 36. Pen 50 has a cylindrical barrel 52 terminating in a convex or conical bottom end 54 from which extends cylindrical tip 56. This tip terminates in a ball point 58. Bottom end 54 of the barrel seats in concavity 34 of the screw and the barrel extends outwardly of the threaded hole of the nut. When the nut is screwed tightly on the screw shank the portions separated by slot 30 are drawn together and press against opposite sides of tip 56 to hold the pen upright with point 58 extending below the bottom of the ruler. When the nut is loosened, the tip 56 is released so that the pen can be withdrawn from the ruler.

The pivot point of the compass ruler 10 is provided with a push pin assembly 60. This assembly as shown in FIGS. 1, 2 and 4 includes a cylindrical cap 64 with circular top 66 and three flexible prongs 68 formed by slots 69 in the cylindrical wall of the cap. The prongs have beveled tips 70. Extending axially of the cap is a pin 72 terminating in a sharp point 74. A coil spring 73 is mounted on pin 72. Assembly 60 further includes a screw 75 formed with an upper wider axial bore 77 and lower narrower axial hole 82 communicating with bore 77; see FIGS. 2 and 4A. The screw is externally threaded at the bottom to engage in a threaded hole 76 in the ruler bar 12 at 0 position of the scales. A nut 78 engages on the upper part of thread 79 of the screw. Diametrally aligned radial slots 80 are formed in the top of the screw and these slots extend downwardly just beyond the top of thread 79 and the bottom of bore 77. The top of screw 75 is formed with an annular beveled lip 81 on which engage the tips 70 of prongs 68. Coil spring 73 keeps the cap extended above the screw and spaced from nut 78. Pin 72 extends through axial hole 82 in the screw which communicates with bore 77. The pin is normally retracted in hole 84 which is an axial extension of threaded hole 76. When cap 64 is pushed down, the point 74 of pin 72 extends out of the bottom of the ruler bar 12 through hole 84. If nut 78 is tightened on screw 75, the portions of the screw which flare out slightly on opposite sides of slot 80 are drawn together sufficiently to lock pin 72 in hole 82 in the screw to hold the cap 64 in a depressed position. The pin is gripped in hole 82 between the bottom of bore 77 and the bottom of slots 80.

From an inspection of the drawing, it will be apparent that the ruling pen can be positioned anywhere along the scales 18 and 20 and locked in position. The pin 72 can be extended and locked in position at the zero position of the scales. Thus the bar 12 can be used as the radial arm of a compass. Any size circle can be made depending on the length of the scale selected. The ruler can be twelve inches or thirty centimeters long, or of any other length, greater or less as may be desired. Pointers 42 will indicate at scale 18 or 20 the radius of the arc or circle being drawn.

In FIGS. 6 or 7 the compass ruler 10A similar to compass ruler, except that the pen 50 has been replaced by a knife blade 86 and a tool holder 90. The tool holder has a cylindrical barrel 92 with curved bottom end 54 so that it seats snugly in the concavity 34 at the top of screw 24. A diametral slot 94 is formed in the bottom of the holder. The knife blade 86 has a shank 95 which fits into an axial hole or bore 98 in the barrel 92. One side of the barrel has a threaded hole 99 aligned with an unthreaded hole 97 in the other side of the barrel. Adjustment screw 100 has a shank 102 with threaded portion engaged in the threaded hole 99 and extending through hole 97. Head 104 of the screw bears on the side of the barrel. When screw 100 is tightened, the sides of the barrel separated by slot 94 are drawn together to hold the knife blade securely in the barrel. The shank 95 of the knife blade is gripped by the sides of the split screw 24 when nut 36 is tightened on the screw as explained in connection with compass ruler 10.

In FIGS. 8 and 9, stylus 106 is inserted into holder 90 in place of the shank 95 holding knife blade 86. The pointed end 108 of the stylus will extend below the bottom of the ruler bar 12 in the same manner as knife blade 86 shown in FIG. 6 and pen point 56 shown in FIG. 2. Other types of tools than styluses and knife blades can be inserted into the holder and mounted on the ruler bar 12.

In FIGS. 10-15 is shown another compass ruler 10B in which ruler bar 12' has a multiplicity of holes 110 spaced apart longitudinally of the ruler at scale lines 112 of scale 18'. The bottom portions 110' of the holes are wider than the upper portions 110". An instrument such as a ruling pen 116 has a cylindrical barrel 117 which fits frictionally in hole portion 110". A ring 118 is fitted on the barrel and seats snugly in lower hole portion 110'. Pen point 120 extends below the ring for drawing an arc or circle.

The pivot point of compass ruler 10B includes a pin 122 with a head 124. The pin extends through hole 125 formed in the bar 12' at the zero position of scale 18'. The bar has a shallow dished recess 126 formed above hole 125. Pin 122 can be a thumb tack which will hold the bar 12' rotatably on a flat surface while bar is turned and pen 116 draws an arc or circle. If desired a flexible disk 130 can be fitted into recess 126 and engaged in indentations 132 formed in opposite sides of the recess. The disk 130 can be removed along with pin 122 by pushing the pin and disk outwardly of the top of the recess while pressing the pin 122 against a hard surface which the pin cannot penetrate.

For coarse work, a draftsman can place his finger in recess and use his finger as a pivot point without using pin 122. The pen 116 can be located anywhere along bar 12' where there is a hole 110. If desired pen 116 can be replaced by other types of tools. Thus as shown in FIG. 15, barrel 117' of a knife blade holder 116' is secured in a ring 118 for mounting in a hole 110 of the compass ruler 10B. Blade 136 has a shank 138 removably engaged in bore 140 of the holder.

In all forms of the invention, the bar 12 or 12' can be used as a measuring ruler in conventional ways. The bar is quickly converted to use as a compass by operating or attaching pivot pin and a ruling pen or pencil or other tool or instrument.

While we have illustrated and described the preferred embodiments of our invention it is to be understood that we do not limit ourselves to the precise construction herein disclosed that various changes and modifications may be made within the scope of the invention.

What is claimed is:

1. A compass ruler comprising a flat elongated bar having a linear graduated scale along one edge; pivot means on the bar located at one end of the scale; scribing means; and support means removably holding said scribing means on the bar at any selected position for scribing arcs and circles when the bar is turned around said pivot means; said pivot means comprising a screw with radially slotted shank having a wider axial bore and narrower hole, a pin extending axially through said bore and hole and gripped by said shank in said hole, spring means in said bore normally holding the pin retracted from the underside of the bar, and a nut engaged on the shank of the screw and arranged to tighten the grip of the screw shank on the pin when the pin is extended against bias in the spring out of the underside of the bar.

2. A compass ruler as defined by claim 1, wherein said bar has a long slot therein extending parallel to said scale said scribing means comprising a scribing instrument having a cylindrical holder, said support means comprising another screw slidably disposed in said slot, said other screw having a slotted other shank to receive and grip an end of said instrument, and another nut engaged on the other screw to lock the other screw in any selected position along the bar and to tighten the grip of said other shank of the other screw on said end of the instrument.

3. A compass ruler as defined by claim 1, wherein said end of the instrument comprises a writing point extending below the underside of said bar.

4. A compass ruler as defined by claim 1, wherein said end of the instrument comprises a cutting blade extending below the underside of said bar.

5. A compass ruler as defined by claim 2, further comprising a flat apertured plate having an index line at one end, said plate being mounted on the bar and engaged on said other shank under said other nut so that said index line extends parallel to graduations of said scale and indicates the positions of said scribing instrument along the scale.

References Cited

UNITED STATES PATENTS

| | | | |
|---|---|---|---|
| 308,466 | 11/1884 | Claflin | 33—27 |
| 776,897 | 12/1904 | Ferris | 33—27 |
| 1,109,467 | 9/1914 | Robinson | 33—149 |
| 2,389,303 | 11/1945 | Forslund | 33—75 |

LEONARD FORMAN, Primary Examiner

CHARLES E. PHILLIPS, Assistant Examiner